United States Patent [19]

Masuzawa et al.

[11] Patent Number: 5,015,830

[45] Date of Patent: May 14, 1991

[54] ELECTRONIC CARD READING DEVICE

[75] Inventors: Shigeaki Masuzawa; Shigeki Komaki, both of Nara, Japan

[73] Assignee: Sharp Kabushiki Kaisha, Osaka, Japan

[21] Appl. No.: 374,879

[22] Filed: Jul. 3, 1989

[30] Foreign Application Priority Data

Jul. 4, 1988 [JP] Japan ............................. 63-88858[U]
Jul. 13, 1988 [JP] Japan ............................. 63-92595[U]

[51] Int. Cl.⁵ ..................... G06F 15/02; G06K 5/00
[52] U.S. Cl. ................................. 235/441; 235/380; 235/486; 364/705.01; 206/305
[58] Field of Search ............... 235/441, 380, 379, 486, 235/492; 364/705.01, 707, 708; 206/305, 232; 150/132-142

[56] References Cited

U.S. PATENT DOCUMENTS

| | | | |
|---|---|---|---|
| 4,075,702 | 2/1978 | Davies ............................. | 364/708 X |
| 4,141,401 | 2/1979 | Hindemit ........................ | 206/305 X |
| 4,209,735 | 6/1980 | Yoshida .......................... | 364/707 X |
| 4,259,568 | 3/1981 | Dynesen ......................... | 206/305 X |
| 4,587,409 | 5/1986 | Nishimura et al. | |
| 4,670,853 | 6/1987 | Stepien .......................... | 364/705.01 |
| 4,719,338 | 1/1988 | Avery et al. ................... | 235/441 X |
| 4,777,563 | 10/1988 | Teraoka et al. ................ | 364/708 X |

FOREIGN PATENT DOCUMENTS 3632294 4/1988 Fed. Rep. of Germany .
57-152063 9/1982 Japan .
60220482 4/1986 Japan .

OTHER PUBLICATIONS

IBM Technical Disclosure Bulletin vol. 10, No. 3, Aug. 1967 p. 188.

*Primary Examiner*—Stuart S. Levy
*Assistant Examiner*—Steven M. duBois

[57] ABSTRACT

An electronic card reading device for reading the data stored in an electronic card by electrically bringing the electronic card into contact with the reading device and for displaying the data that is read on a display thereof comprising; a main unit in the form of a thin plate having card contacts which are electrically brought into contact with an electronic card, an integrated circuit, and a display on which to display the data which is read from the electronic card, a power source in the form of a thin plate which is electrically connected to the main unit to supply power thereto, the power source being constructed so as to be separate from the main unit, and a soft cover having a housing portion for the main unit and another housing portion for the power source, in which the main unit and the power source are separately housed, and having an electronic card pocket which is so disposed that an electronic card can be inserted therein and the electronic card thus inserted is brought into contact with the card contacts of the main unit which is housed in the main unit housing portion.

8 Claims, 5 Drawing Sheets

ELECTRONIC CARD READING DEVICE

BACKGROUND OF THE INVENTION

1. Field of the Invention

The present invention relates to a portable type electronic card reading device which is used to read the data stored in an electronic card such as an IC card, and the like.

2. Description of the Prior Art

An IC card incorporates a microcomputer and an IC memory for the increased memory capacity and the data stored therein can be read by a reading device. An IC card which enables both reading and writing of data with the use of a read/write memory has also been developed. As an IC card is handy to carry, a portable IC card reading device has been developed recently so that the data stored in the card can be read at any time and place.

FIG. 7 shows an example of such a portable type IC card reading device. This IC card reading device comprises a box-shaped hard case 81 made of a hard material such as a hard plastic which is slightly larger than an IC card. In the hard case 81, various kinds of electronic components such as a power source, an integrated circuit, card contacts, etc., are housed. On one side face of the hard case 81, a card insertion opening 82 is formed, through which an IC card can be inserted. The IC card which is inserted into the hard case 81 through the card insertion opening 82 is electrically brought into contact with the card contacts in the hard case 81, so that the data in the IC card is read.

A key operational section 83 comprising a plurality of input keys and a display portion 84 are disposed on the upper surface of the hard case 81. The operation of the keys enables data to be written in the IC card which is inserted in the hard case 81, and the data stored therein is displayed on the display portion 84.

As shown in FIG. 8, another reading device having a hard case 91 made of a hard material such as hard plastic, which can be folded in two just like a book. In this reading device, an IC card is placed between the two half portions of the foldable hard case 91. On the upper surface of the hard case 91, a key operational section 93 comprising a plurality of input keys and a display portion 94 are disposed.

These IC card reading devices mentioned above are portable as the hard cases 81 and 91 thereof are only slightly larger than an IC card. However, they are still too large for a person to carry in a breast pocket, etc. Furthermore, since the hard cases 81 and 91 are made of a hard material such as a hard plastic, etc., uncomfortableness may be felt when the hard case 81 or 91 is brought into contact with the skin under a breast pocket. In order to reduce a sense of this uncomfortableness, it has been suggested that, as shown in FIG. 7, a reading device is housed by a pair of bands 86 onto a foldable soft cover 85 made of plasticized vinyl chloride so that the hard case 81 thereof can be completely covered by the soft cover 85. When the reading device is put in a breast pocket with the whole hard case 81 covered with the soft cover 85, a sense of uncomfortableness due to the material of the hard case 81 can be reduced. However, in this case, the total volume of the hard case 81 may be increased by the volume of the soft cover 85, thereby decreasing the portability of the reading device.

As an ordinary person usually carries a credit card, a driver's license, cash, etc., with him, he would not take the trouble to carry such an IC card reading device of relatively large size in addition to these many personal belongings, unless it is inevitable to do so.

For this reason, it is considered necessary to develop a small-sized IC card reading device. However, a small-sized IC card reading device means that a battery which is a power source must be also small sized, resulting in a problem that the electric capacity is accordingly decreased and the battery life is shortened. Moreover, as mentioned above, since a battery is housed in the hard case 81 or 91, it is not easy to replace.

SUMMARY OF THE INVENTION

The electronic card reading device of the present invention, which overcomes the above-discussed and numerous other disadvantages and deficiencies of the prior art, is a device for reading the data stored in an electronic card by electrically bringing the electronic card into contact with the reading device and for displaying the data that is read on a display, the said device comprising; a main unit in the form of a thin plate having card contacts which is electrically brought into contact with an electronic card, an integrated circuit, and a display portion for displaying the data that is read from the electronic card, a power source in the form of a thin plate which is electrically connected to the main unit to supply power thereto, said power source being constructed so as to be separate from the main unit, and a soft cover having a housing portion for the main unit and another housing portion for the power source, in which the main unit and the power source are separately housed, and having an electronic card pocket which is so disposed that an electronic card can be inserted therein and the electronic card thus inserted can be brought into contact with the card contacts of the main unit which is housed in the main unit housing portion.

In a preferred embodiment, the soft cover has a card pocket to accommodate various cards such as a credit card, etc. therein.

In a more preferred embodiment, the soft cover can be folded in two so that respective half portions of the soft cover overlap each other and the card pocket and the power source housing portion are disposed in one half portion thereof.

In a more preferred embodiment, the power source accommodated in the power source housing portion is electrically connected to the main unit accommodated in the main unit housing portion by means of a flexible connecting member.

In a more preferred embodiment, the soft cover can be folded in two so that respective half portions thereof overlap each other, and only the card pocket is disposed in one half portion thereof.

In a more preferred embodiment, the soft cover is so constructed that the main unit housing portion, the electronic card pocket, the power source housing portion and the card pocket are disposed one on top of each other.

In a preferred embodiment, the power source is of a sheet-type battery.

In a preferred embodiment, the main unit has a key operational section with which to write data in an electronic card that is brought into contact the main unit.

Thus, the invention described herein makes possible the objectives of (1) providing an electronic card reading device in which the main unit and the power source are accommodated separately in respective housing portions of the soft cover, so that the reading device can be made very thin and handy to carry; (2) providing an electronic card reading device which is completely covered with a soft cover made of a plasticized material, so that a sense of uncomfortableness may be reduced when the device is carried in a breast pocket, etc.; (3) providing an electronic card reading device in which the card pocket for credit cards, etc., is provided in the soft cover thereof, so that those items which must be always carried with a person can be accommodated in the card pocket, thereby making the device very convenient to carry about; and (4) providing an electronic card reading device in which credit cards, etc., can be accommodated in the card pocket thereof, so that the chance is greater that the reading device may be carried on a person.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
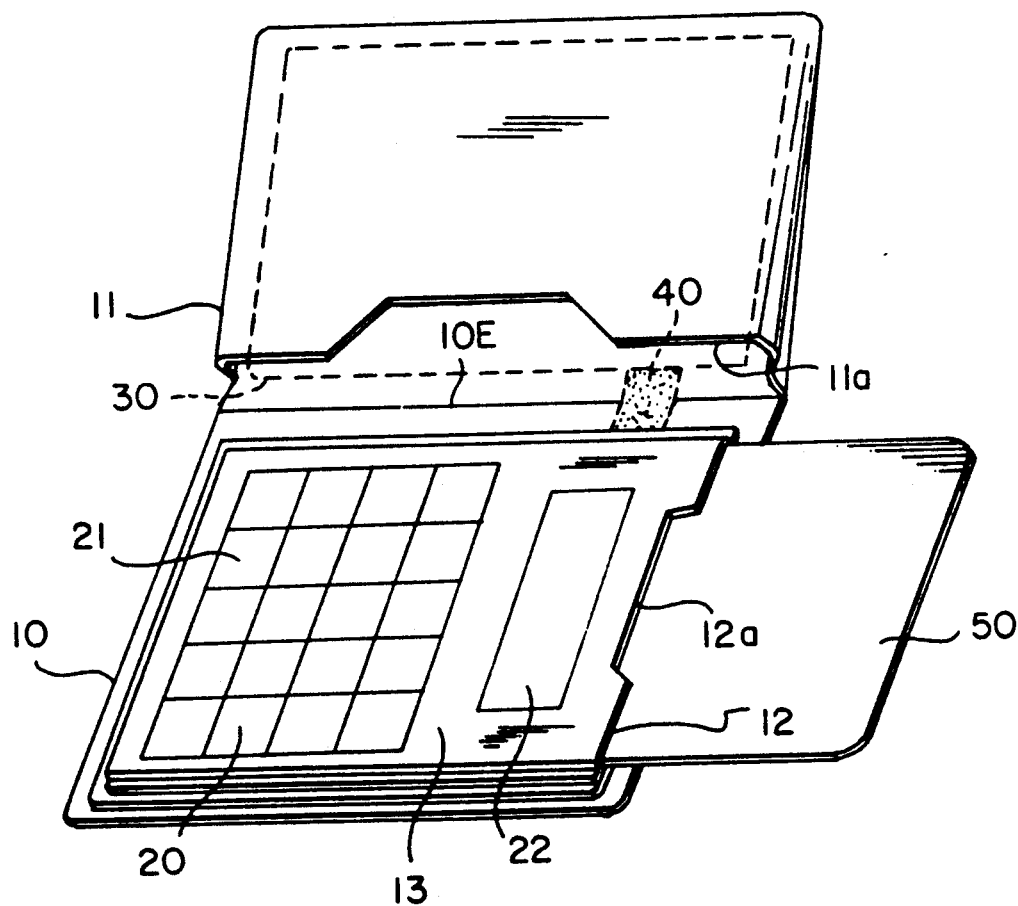
FIG. 1 is a perspective view of an IC card reading device which is an example of an electronic card reading device of this invention.
Figure 2:
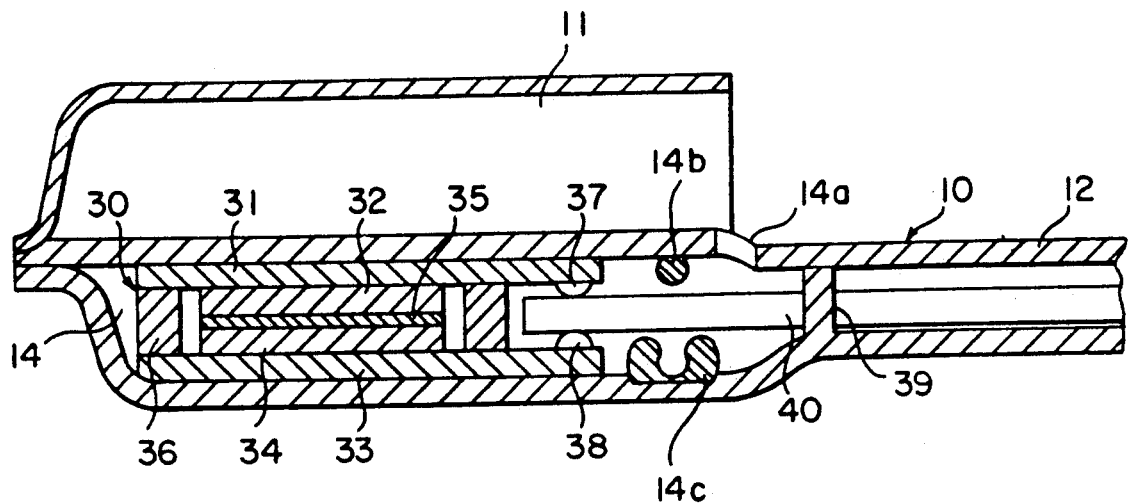
FIG. 2 is a sectional view of the power source housing portion and the card pocket of the IC card reading device shown in FIG. 1.

FIGS. 1 and 2 show an IC card reading device of this invention which has a soft cover 10 made of a flexible material such as a plasticized vinyl chloride sheet, etc. The soft cover 10 can be folded in two so that the respective thin rectangular half portions thereof overlap each other. A card pocket 11 is formed on the inner surface of one half portion thereof which faces the other half portion thereof. The card pocket 11 has an opening 11a along the central folding section thereof, and the opening 11a is kept open so that name cards, credit cards, driver's license, etc., can be accommodated therein.

On the inner surface of the other half portion of the soft cover 10, an IC card pocket 12 is formed by a pocket forming piece so that an IC card 50 can be accommodated therein. The IC card pocket 12 has an opening 12a in the direction which is at right angles to the central folding section, and the IC card 50 can be inserted into the IC card pocket 12 through the opening 12a.

The thin rectangular pocket forming piece which forms the IC card pocket 12 is also the main unit housing portion 13, inside which the main unit 20 is accommodated. The main unit 20 accommodated in the main unit housing portion 13 is in the form of a thin plate and has card contacts which are electrically brought into contact with the IC card 50 inserted in the IC card pocket 12, an integrated circuit, a key operational section 21 comprising a plurality of input keys, and a display portion 22 which is disposed in the vicinity of the key operational section 21, etc. The main unit 20 is so accommodated in the main unit housing portion 13 that the surface on which the key operational section 21 and the display portion 22 are disposed can be the inner side of one half portion which faces the other half portion. Openings are formed on this inner side of the main unit housing portion 13 so that the key operational section 21 and the display portion 22 can be exposed externally.

A thin, rectangular power source housing portion 14 is formed on the outer side of the half portion on the inner side of which the card pocket 11 is disposed. The power source housing portion 14 has an opening 14a which is formed along the inner side of the folding section of the soft cover 10. A sheet-type battery 30 is accommodated in the power source housing portion 14, as shown in FIG. 2. The sheet-type battery is electrically connected to the main unit 20 accommodated in the main unit housing portion 13 by means of a flexible conductive connecting member 40, thereby supplying power to the main unit 20.

The sheet-type battery 30 has a thin plate 32 made of metal oxide supported substantially at the center of a sheet-shaped positive electrode 31 made of a metal such as stainless steel, etc., and a thin plate 34 made of a carbon material supported substantially at the center of a sheet-shaped negative electrode 33 made of a metal such as stainless steel, etc., and the thin plate 32 made of metal oxide and the thin plate 34 made of a carbon material face each other with a separator 35 placed therebetween. A sealing member 36 is mounted between the positive electrode 31 and the negative electrode 33 which face each other in such a manner that the sealing member 36 surrounds the thin plate 32 made of metal oxide and the thin plate 34 made of a carbon material, thereby firmly connecting the positive electrode 31 and the negative electrode 33 to each other. The sheet-shaped positive electrode 31 and the sheet-shaped negative electrode 33 hold the whole of the sheet-type battery 30 at its required strength. One end of the positive electrode 31 and that of the negative electrode 33 extend outside the sealing member 36 and face each other. Connecting terminals 37 and 38 are disposed with a proper interval therebetween on the respective facing surfaces of the above-mentioned end portions of the positive electrode 31 and the negative electrode 33. The sheet-type battery 30 is so accommodated that the end portions of the positive electrode 31 and the negative electrode 33 on which the connecting terminals 37 and 38 are disposed, come in the vicinity of the opening 14a of the power source housing portion 14. An end portion of the flexible conductive connecting member 40 is pressed into the interval between the connecting terminals 37 and 38 so that this end portion is brought into contact with the connecting terminals 37 and 38, thereby electrically connecting the connecting member 40 to the connecting terminals 37 and 38. The connecting member 40 extends from the power source housing portion 14 and is electrically connected to the components, to which power must be supplied, such as the integrated circuit, etc., in the main unit 20 accommodated in the main unit housing portion 13.

A pair of fixing strips 39 (only one is shown in FIG. 2) which come in contact with each side edge of the connecting member 40 so as to prevent the connecting member 40 from moving is disposed in the power source housing portion 14. The connecting member 40 is fixed by each fixing strip 39 so that even when the connecting member 40 moves as the two half portions of the soft cover 10 which have overlapped each other are now opened, the connecting member 40 and the connecting terminals 37 and 38 are not electrically disconnected. The male portion 14b and female portion 14c of a fastener are respectively formed on the faces opposite to each other inside the power source housing portion 14 along the opening 14a, except for the region in which the connecting member 40 is disposed. The male portion 14b and the female portion 14c are so constructed that they can be engaged with each other. Thus, the opening 14a is closed by mutual engagement between the male portion 14b and the female portion 14c.

The IC card 50 inserted in the IC card pocket 12 in the soft cover 10 is electrically connected to the card contacts of the main unit 20 accommodated in the main unit housing portion 13, and the data written in the IC card 50 is read by power supplied from the sheet-type battery 30 accommodated in the power source housing portion 14. The data that is read is displayed on the display portion 22 of the main unit 20. Besides, it is possible to write data in the IC card 50 by operating the input keys on the key operational section 21.

When replacing a sheet-type battery 30 accommodated in the power source housing portion 14, first, the male portion 14b and the female portion 14c of the fastener disposed along the opening 14a of the power source housing portion 14 are disengaged (FIG. 2), so that opening 14a is opened. Then the connecting member 40 is disconnected from the connecting terminals 37 and 38 of the sheet-type battery 30. The sheet-type battery 30 is removed through the opening 14a. Thereafter, a new sheet-type battery 30 is inserted into the power source housing portion 14 through the opening 14a which is open, and the end portion of the connecting member 40 is inserted between the connecting terminals 37 and 38 of the sheet-type battery 30 accommodated in the power source housing portion 14, so that the connecting terminals 37 and 38 and the connecting member 40 are electrically connected to each other. Subsequently, the male portion 14b and the female portion 14c of the fastener is engaged with each other, so that the opening 14a is closed.

The IC card reading device of this example enables credit cards, name cards, cash, and driver's license, etc., to be accommodated in the card pocket 11. Thus, if these items which usually must be carried on a person, are accommodated in the card pocket 11, the chance is greater that the IC card reading device is carried with a person, resulting in that the IC card reading device is there when it is necessary to read the data in the IC card. In addition, as the IC card reading device of this example is housed in a soft cover instead of a hard case such as a hard plastic, the volume of the IC card reading device is decreased so that a sense of uncomfortableness can be reduced when the device is carried in a breast pocket, etc., thanks to the feel of the soft cover.

A sheet-type battery 30 accommodated in the power source housing portion 14 helps to increase the strength of the whole device, and credit cards, etc., accommodated in the card pocket 11 helps to further strengthen the device. As the area of the sheet-type battery 30 can be made substantially equal to that of the card pocket 11, the electric capacity of the sheet-type battery can be made relatively large even though the whole IC card reading device is thin. When the device is carried, for the protection of the display portion 22 and the key operational section 21 of the main unit 20, they are covered with a half portion of the soft cover 10 on which the card pocket 11 is formed.

EXAMPLE 2

Figure 3:
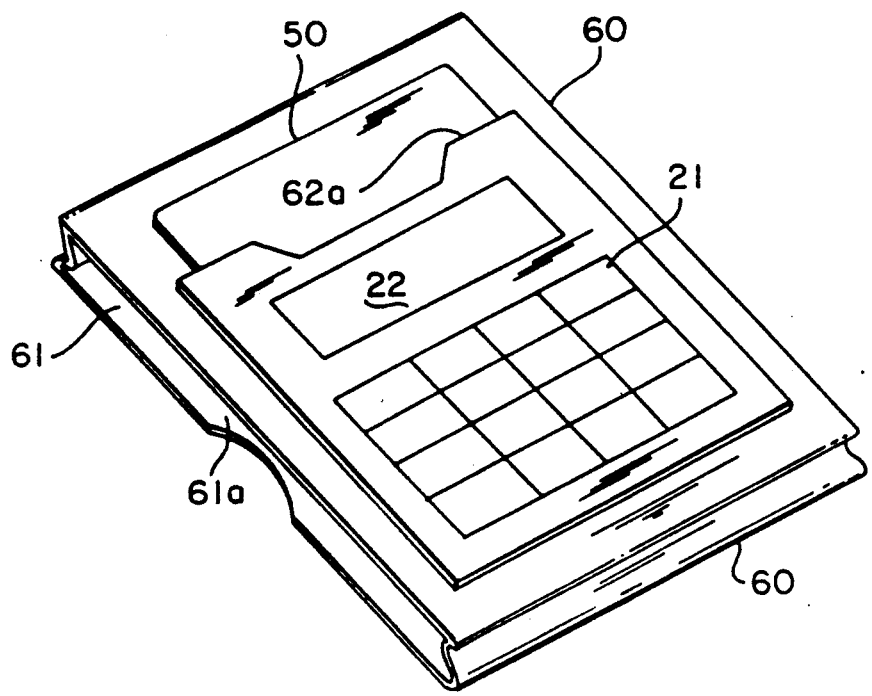
FIG. 3 is a perspective view of another IC card reading device of this invention.
Figure 4:
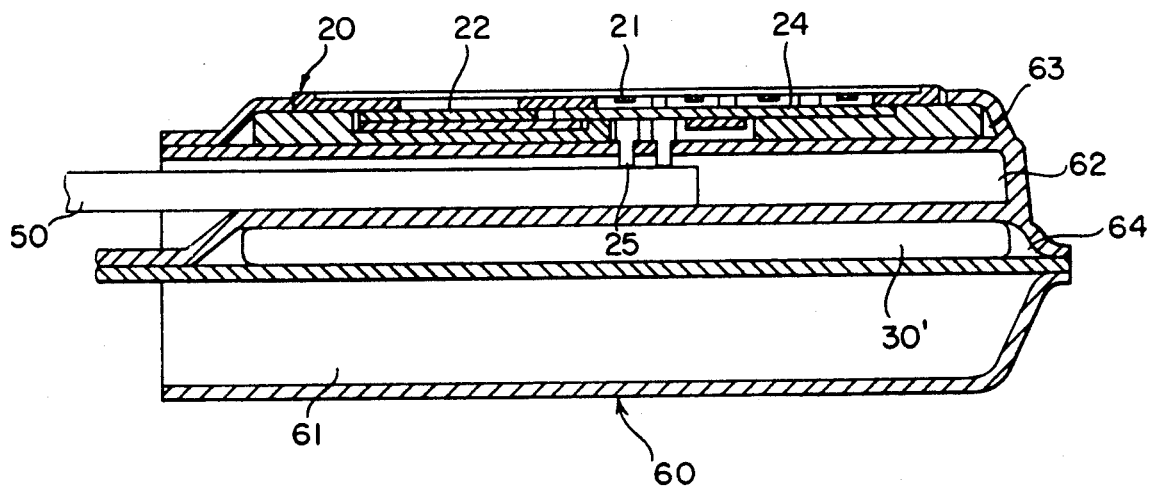
FIG. 4 is a sectional view of the IC card reading device shown in FIG. 3.

FIGS. 3 and 4 show another IC card reading device of this invention, which has a thin, rectangular soft case 60. A card pocket 61 to accommodate name cards, credit cards, etc., therein is provided in the soft case 60. Three sides of the card pocket 61 are closed, and the remaining one side which extends in the longitudinal direction is open, thereby forming an opening 61a. A thin, rectangular power source housing portion 64 is formed on the upper piece constituting the card pocket 61. Inside the power source housing portion 64, a thin sheet-type battery 30' which has substantially the same structure as the sheet-type battery used in Example 1 is accommodated.

An IC card pocket 62 is formed by a pocket forming piece on the outer surface of the power source housing portion 64. The IC card pocket 62 has an opening 62a formed in the direction which is at right angle to the opening 61a of the card pocket 61, and an IC card 50 is inserted into the IC card pocket 62 through the opening 62a.

The thin, rectangular pocket forming piece which forms the IC card pocket 62, is also the main unit housing portion 63, inside which, the main unit 20 is accommodated. Thus, the main unit housing portion 63, the IC card pocket 62, the power source housing portion 64 and the card pocket 61 are disposed one on top of each other.

Figure 5:
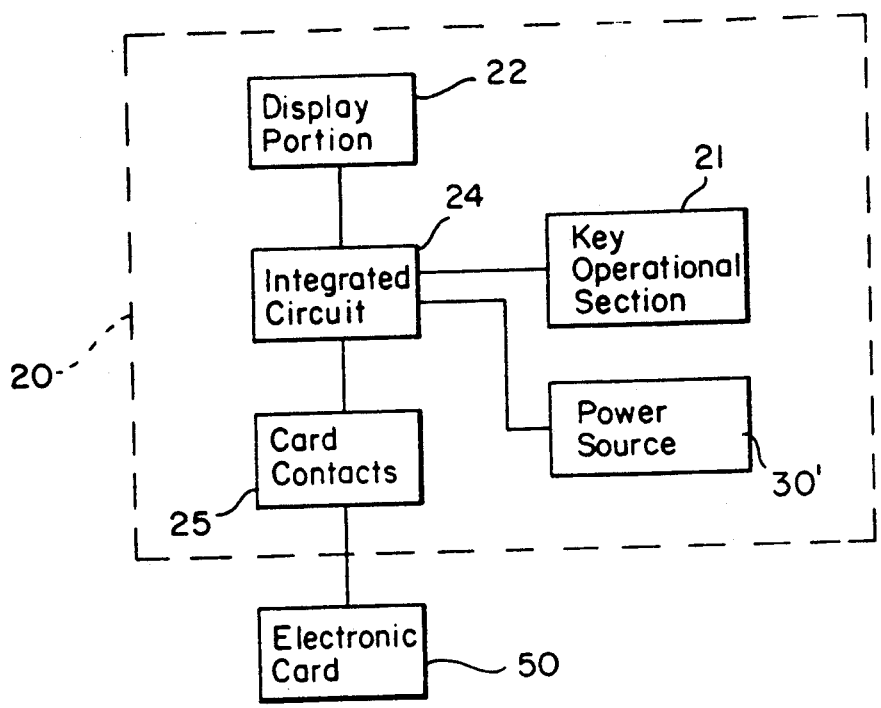
FIG. 5 is a block diagram of the IC card reading device shown in FIG. 3.

The main unit 20 accommodated in the main unit housing portion 63 is so constructed as to be the same as the unit 20 in Example 1, and the main unit 20 is electrically connected to a sheet-type battery 30' accommodated in the power source housing portion 64 by a connecting member (not shown). Inside the main unit 20, an integrated circuit 24 in which LSI chips are directly adhered to a flexible substrate such as polyamide film, etc. by anisotropic conductive adhesive is disposed. Contacts for the key entry are also disposed on the substrate. The key operational section 21 is disposed on the surface opposite to the contacts for the key entry. The key operational section 21 is composed of vinyl chloride film, polyester film, or the like, on which the characters are printed for the key operation. The display portion 22 for which film liquid crystal display elements are used is disposed in the vicinity of the key operational section 21 on the upper surface of the main unit 20. As film liquid crystal display elements are used, the strength of the display portion 22 against bending is increased. The main unit 20 is so accommodated in the main unit housing portion 63 that the surface on which the key operational section 21 and the display portion 22 are disposed faces outside. And card contacts 25 composed of elastic conductive rubber are disposed on the bottom face of the main unit 20. The card contacts 25 protrude through the main unit housing portion 63 into the IC card pocket 62 so that the IC card 50 inserted in the IC card pocket 62 comes into contact with the end tip of the card contacts 25 and is electrically connected thereto. Openings are formed on the outer surface of the main unit housing portion 63 so that the key operational section 21 and the display portion 22 of the main unit 20 can be exposed externally. FIG. 5 is a block diagram of the IC card reading device of this example.

The display portion 22, the key operational section 21, the integrated circuit 24 and the card contacts 25 of the main unit 20 are made thin and are formed to be about 0.76 mm thick, which is equivalent to the thickness of a credit card. The sheet-type battery 30' accommodated in the power source portion 64 is also formed to be as thin as a credit card.

The soft case 60 is made of synthetic leather such as a vinyl chloride sheet, urethane sheet, etc. In order to give a high quality image, it can also be made of cow hide, pig hide, etc.

The sheet-type battery 30' accommodated in the power source housing portion 64 is so structured that the area of the positive electrode and negative electrode composed of a metal plate equals the area of the IC card pocket 62, thereby increasing the strength of the IC card, and increasing the electric capacity of the whole sheet-type battery 30' even though the sheet-type battery 30' is thin.

As in the case of the IC card reading device in Example 1, the data written in the IC card 50 inserted in the IC card pocket 62 is displayed on the display portion 22 and data can be written in the IC card 50, using the key operational section 21 of the main unit 20 in the IC card reading device of this example.

Also, as in the case of the IC card reading device in Example 1, the IC card reading device of this example is also made thin with the use of a soft case instead of a hard case. Though the soft case is used, the strength of the whole IC card reading device is ensured by a sheet-type battery 30' accommodated in the power source housing portion 64. In addition, credit cards, driver's license, etc. which are accommodated in the card pocket 61 also help to increase the strength thereof.

EXAMPLE 3

Figure 6:
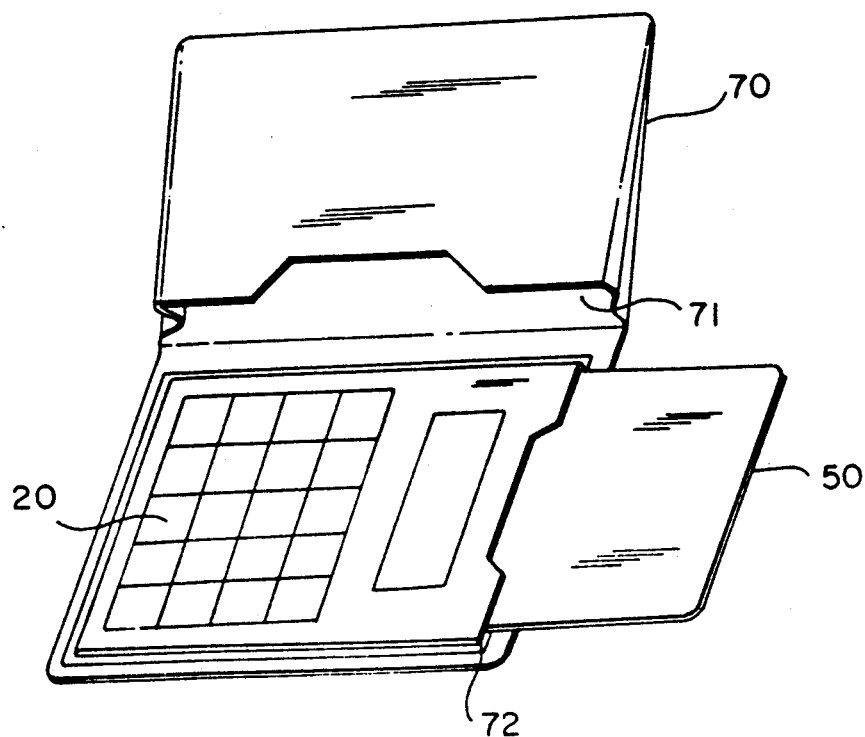
FIG. 6 is a perspective view of still another IC card reading device of this invention.

FIG. 6 shows still another IC card reading device of this invention, which comprises a soft cover 70 that can be folded in two. The inner side of one of the two half portions of the soft cover 70 which overlap each other is provided with a card pocket 71, and the opening of the card pocket 71 is formed along the inner side of the folding section. The other half portion of the soft cover 70 is of the same structure as the soft cover of Example 2, except that the card pocket is not formed therein. A power source housing portion in which the sheet-type battery is accommodated, is disposed on the outer side of this other half portion, and an IC card pocket 72 is formed by a pocket forming piece on the inner side thereof. The thin, rectangular pocket forming piece which forms the IC card pocket 72 is also the main unit housing portion, inside which, the main unit 20 is accommodated.

As in the case of the IC card reading devices in Examples 1 and 2, the IC card reading device of this example is also thin and is not bulky. Moreover, the whole strength of the device is ensured by a sheet-type battery in the power source portion and credit cards, etc. which are accommodated in the card pocket 71. As in the case of the IC card reading device of Example 1, the main unit 20 of this example is completely covered with the half portion of the soft cover 70 on which the card pocket 71 is formed, so that the main unit 20 is protected while the device is not used.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An electronic card reading device for reading the data stored in an electronic card by electrically bringing said electronic card into contact with the reading device and for displaying the data that is read on a display, wherein said device comprises:

a main unit in the form of a thin plate having card contacts which are electrically brought into contact with an electronic card, an integrated circuit, and a display portion for displaying the data which is read from the electronic card, a power source in the form of a thin plate which is electrically connected to said main unit to supply power thereto, said power source being constructed so as to be separate from said main unit, and a soft cover having a housing portion for said main unit and another housing portion for said power source, in which said main unit and said power source are separately housed, and having an electronic card pocket which is so disposed that an electronic card can be inserted therein and the electronic card thus inserted is brought into contact with said card contacts of said main unit which is housed in said main unit housing portion.

2. An electronic card reading device according to claim 1, wherein said soft cover has a card pocket to accommodate various cards therein.

3. An electronic card reading device according to claim 2, wherein said soft cover can be folded in two so that respective half portions overlap each other and said card pocket and said power source housing portion are disposed in one half portion thereof.

4. An electronic card reading device according to claim 3, wherein said power source accommodated in said power source housing portion is electrically connected to said main unit accommodated in said main unit housing portion by means of a flexible connecting member.

5. An electronic card reading device according to claim 2, wherein said soft cover can be folded in two so that respective half portions thereof overlap each other, and only said card pocket is disposed in one half portion thereof.

6. An electronic card reading device according to claim 2, wherein said soft cover is so constructed that said main unit housing portion, said electronic card pocket, said power source, housing portion, and said card pocket are disposed one on top of another.

7. An electronic card reading device according to claim 1, wherein said power source is of a sheet-type battery.

8. An electronic card reading device according to claim 1, wherein said main unit has a key operational section with which to write data in an electronic card that is brought contact with the reading device.

* * * * *

UNITED STATES PATENT AND TRADEMARK OFFICE
CERTIFICATE OF CORRECTION

PATENT NO. : 5,015,830

DATED : May 14, 1991

INVENTOR(S) : Shigeaki Masuzawa and Shigeki Komaki

Figure 7:
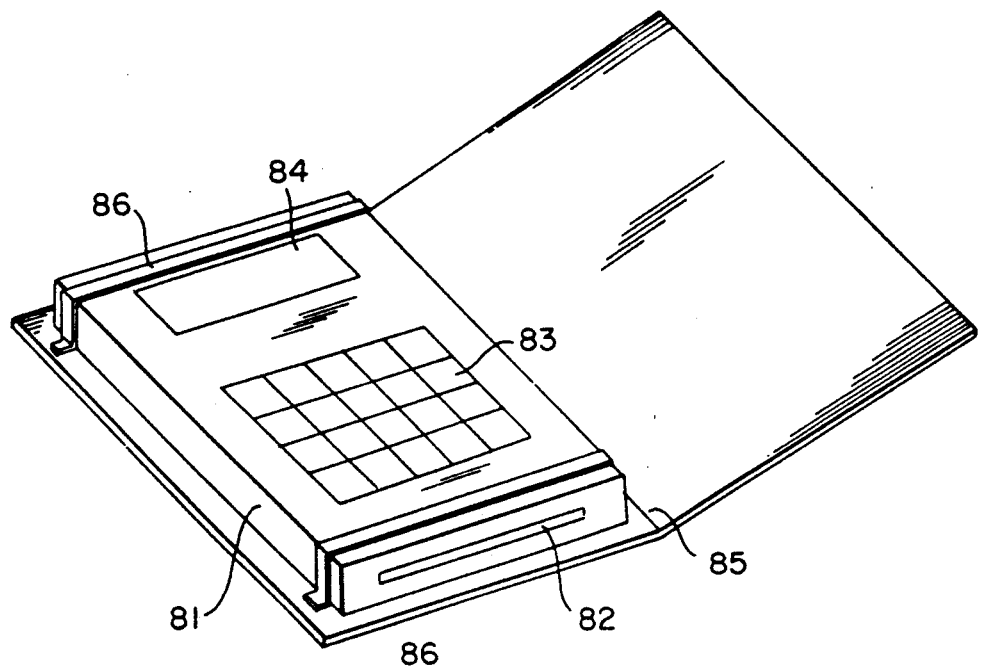
FIGS. 7 and 8 are perspective views of a conventional IC card reading device, respectively.
Figure 8:
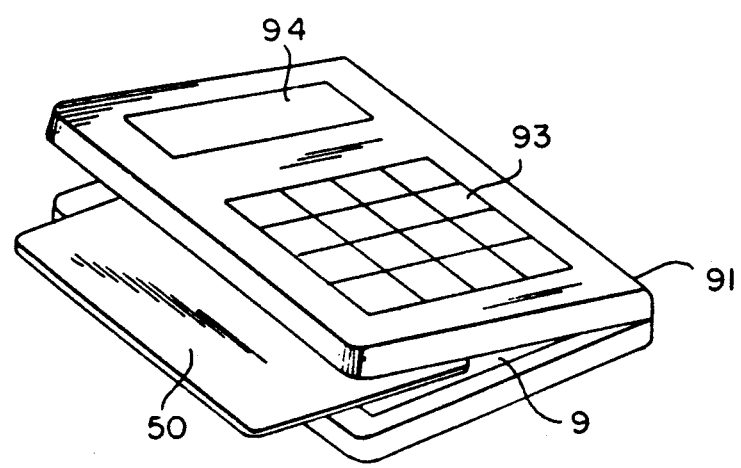

It is certified that error appears in the above-identified patent and that said Letters Patent is hereby corrected as shown below:

Please replace Figure 7 with the corrected Figure 7, as shown on the attached page.

Signed and Sealed this

Third Day of November, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 5,015,830

DATED : May 14, 1991

INVENTOR(S) : Shigeaki MASUZAWA and Shigeki KOMAKI

It is certified that error appears in the above-identified patent and that said Letters Patent is hereby corrected as shown below:

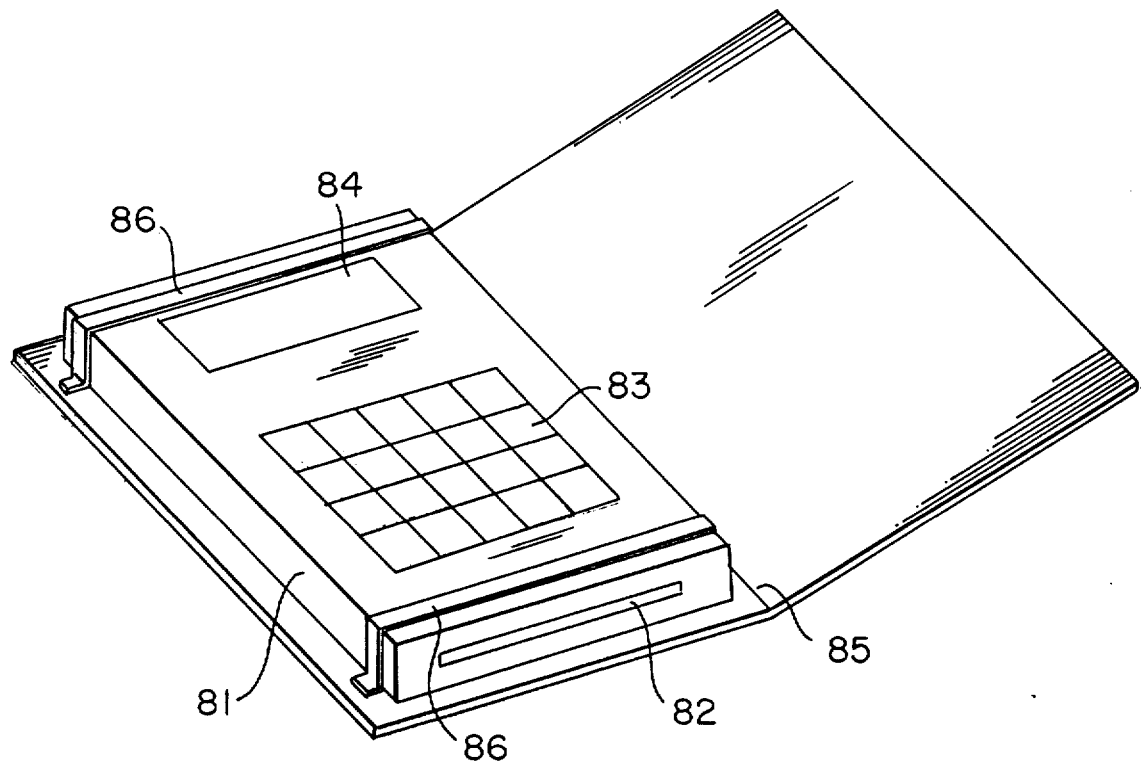

FIG. 7
PRIOR ART